Patented May 11, 1937

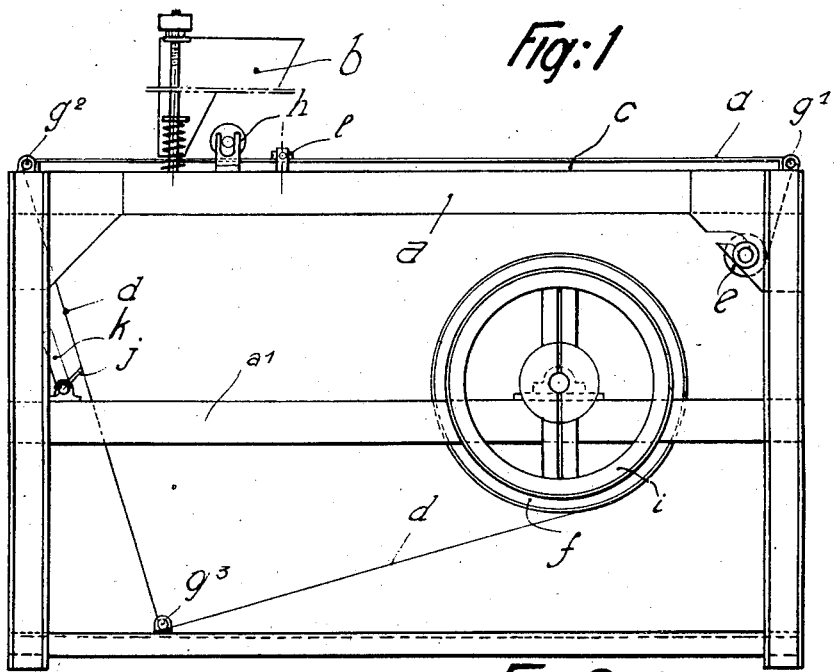
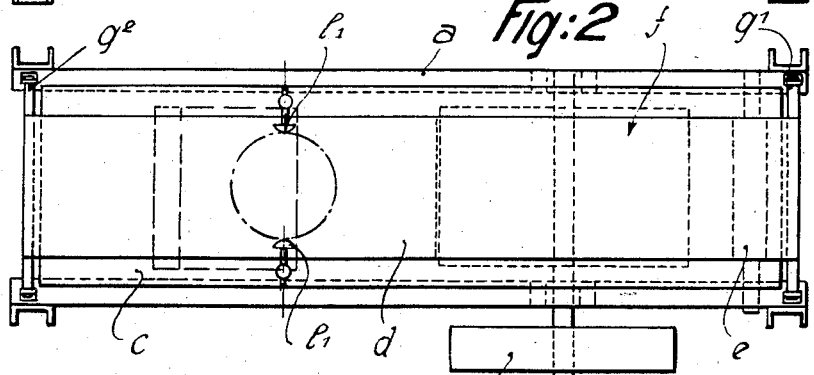
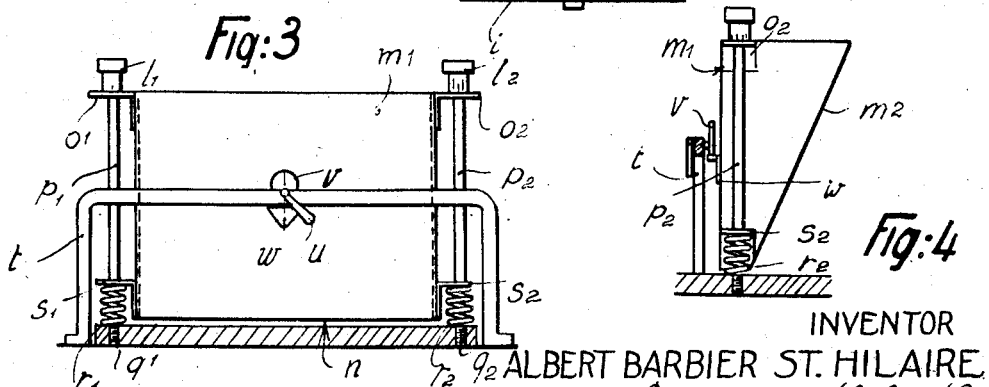

2,079,972

UNITED STATES PATENT OFFICE 2,079,972

APPARATUS FOR MANUFACTURING PHONOGRAPHIC DISKS

Albert Barbier St. Hilaire, Creteil, France, assignor to Societe des Vernis Pyrolac S. A. R. L., Creteil, France

REISSUED

JUL -7 1942

Application November 23, 1934, Serial No. 754,471
In France November 28, 1933

3 Claims. (Cl. 91—43)

The object of the present invention is to provide a method and apparatus for the manufacture of phonographic disks, and in a general way of supports of any kind whatever, either decorated or not and coated with a layer of a varnish of the nitro-cellulose or aceto-cellulose kind, or with other products.

According to the present invention, the disks of cardboard, strong paper, or any other suitable matter, cut to the desired size, are disposed on an endless band of paper or a conveyer band, in such manner as to pass under a hopper for the distribution of the coating product. These disks are then collected in any suitable manner and the band of paper or conveyer belt passes close to a scraping plate, which recuperates the excess of varnish, which drops into a suitable receiver, the band or belt moving further, either for being wound around a drum of large diameter, or for coming again under the feed hopper after having passed between two driving rollers, in the case of an endless paper band.

In a particular embodiment of the invention, the accurate positioning of the disks on the band or belt is obtained, just before said disks pass under the feed hopper, by means of guiding members adjustable in accordance with the size of the disks.

A preferred embodiment of the present invention will be hereinafter described, with reference to the accompanying drawing, given merely by way of example, and in which:

Fig. 1 is a vertical elevational view of a machine according to the present invention;

Fig. 2 is a corresponding plan view;

Fig. 3 is a vertical end view of the feed hopper of the machine;

Fig. 4 is a vertical elevational view corresponding to Fig. 3.

The frame $a$ of the machine shown in the drawing supports, at its upper part, a feed hopper $b$ filled with varnish and the height of which with respect to plate $c$ can be adjusted as it will be hereinafter explained. A band of paper $d$ moves with respect to said frame. This band of paper is, on the one hand, wound around a drum $e$ of relatively small diameter, which serves to distribute the paper band, and, on the other hand, wound around a drum $f$ intended to receive the band of paper after the latter has been used. This drum $f$ is of relatively large diameter so as to avoid differences in the linear velocity of band $d$ as it is being wound around said drum $f$. The movement of said drum $f$ is imparted thereto through a pulley $i$ concentric with drum $f$, said pulley $i$ being itself driven by an electric motor through a speed reducing gear.

Band $d$ passes, at $g^1$, $g^2$ and $g^3$, around rollers or glass rods, so as to avoid, as far as possible, important frictional resistances.

On the cross members $a^1$ of frame $a$, there is pivotally mounted a scraping plate $j$ bearing against the band of paper $d$, as shown by Fig. 1, the pivoting of plate $j$ being controlled through a handle or lever $k$ rigid with said plate.

On plate $c$ there are provided two guiding members $l$, the distance between which is adjustable, owing to the provision of screws, eventually micrometric screws, movable in their supports $l^1$. These guiding members ensure the accurate positioning of the disks on band $d$ immediately before they come under feed hopper $b$. Above the frame there is provided any suitable device for distributing on the band the disks or plates to be varnished, so as to permit an automatic working of the machine. There is further provided a roller $h$ intended to ensure the perfect adhesion of the disks to the band and therefore their perfect engagement under the hopper. The system of rollers $e$ and $f$ for the unwinding and the winding of the band of paper might be replaced by a similar system of rollers, but of equal dimensions for instance, band $d$ being then an endless band.

In a particular embodiment of the invention, illustrated by Figs. 3 and 4, the hopper $b$ comprises two plates $m^1$ and $m^2$, which may be either inclined or not with respect to each other, so as to leave between them a gap or slot $n$ at right angles to the direction of travel of the band. The width of said slot $n$ is adjusted in accordance with the nature and viscosity of the coating product to be fed by said hopper, through said slot, onto the disks or other supports above referred to. The hopper is provided at its upper part with two angle-irons $o^1$ and $o^2$ provided with holes adapted to accommodate threaded rods $p^1$ and $p^2$ which are screwed in plate $c$ at $q^1$ and $q^2$. Springs $r^1$ and $r^2$, concentric with rods $p^1$ and $p^2$, and interposed between plate $c$ of the frame and angle irons $s^1$ and $s^2$ rigidly carried by the hopper, keep said hopper at a well determined height above plate $c$, said height being adjustable by means of micrometric screws $l^1$ and $l^2$ provided above angle irons $o^1$ and $o^2$, which angle irons are therefore provided with marks adapted to cooperate with said micrometric devices.

On the other hand there is provided a bridge-shaped member $t$ carried by the frame and on which is mounted a handle $u$ adapted to control a cam or eccentric $v$ cooperating with angle iron $w$ rigid with the hopper.

It is therefore possible, by operating said handle $u$, to cause angle iron $w$, and therefore the feed hopper, to move downwardly so that it is applied against the support and prevents the liquid present in the hopper from flowing out when the machine ceases to work.

It will then merely remain to trace the records on the disks as soon as they are dry. Consequently the invention is concerned with the application of the method of obtaining plates coated with varnish as above explained to the manufacture of phonographic disks, either by direct recording or through the action of a die, or through electroplating means.

Of course the invention is not to be considered as limited to the embodiment above described, and for instance the structure of the feed hopper, the means for winding and unwinding band $d$, the means for operating scraping band $j$, and also the shape of the frame and the means for driving the paper band are not necessarily of the specific structure above described.

It is also obvious that, according to the thickness of the layer of varnish with which the disk or plate is to be coated on one face or on both faces, I may vary the viscosity of the products contained in the feed hopper and the height of the bottom of said hopper above the plates or disks, and also the speed of unwinding of the paper band, provided that it remains uniform for a given series of plates or disks.

While I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A machine for applying a varnish on disks which comprises, in combination, a frame, a conveyer band of paper movable in said frame and adapted to carry said disks, guiding means for said band of paper for causing a portion thereof, carrying the disks, to slide in its own plane along a horizontal straight path of travel, a drum carrying one end of said band of paper wound thereon, another drum of larger diameter for the winding of the other end of the band of paper thereon, driving means for rotating said second mentioned drum about its axis, a hopper for said varnish carried by said frame above said band provided with a slot in its bottom extending parallelly to said plane in a direction at right angles to said path of travel so as to distribute said varnish over said band and the disks that are carried thereon, a plate pivotally mounted in said frame so as to be able to be brought into or out of contact with the upper face of the portion of the band of paper extending between said hopper and the second mentioned drum, so that said plate can scrape the excess of varnish on said band, and means for controlling the position of said plate with respect to said band.

2. A machine for applying a varnish on disks which comprises, in combination, a frame, a conveyer band of paper movable in said frame and adapted to carry said disks, guiding means for said band of paper for causing a portion thereof, carrying the disks, to slide in its own plane along a horizontal straight path of travel, a drum carrying one end of said band of paper wound thereon, another drum of larger diameter for the winding of the other end of the band of paper thereon, driving means for rotating said second mentioned drum about its axis, two members carried by said frame in an adjustable manner close above said horizontal portion of the band of paper, for accurately determining the position of the disks thereon in a direction at right angles to said path of travel, a hopper for said varnish carried by said frame above said band behind said members, with reference to the direction of travel thereof, said hopper being provided with a slot in its bottom extending parallelly to said plane in a direction at right angles to said path of travel so as to distribute said varnish over said band and the disks that are carried thereon, and means for scraping the upper face of said conveyer band after its passage under said hopper.

3. A machine for applying a varnish on disks, which comprises, in combination, a frame, a conveyer band of paper movable on said frame adapted to carry said disks, guiding means for said band of paper for causing a portion thereof, carrying the disks, to slide in its own plane along a horizontal straight path of travel, a drum carrying one end of said band of paper wound thereon, another drum of larger diameter for winding of the other end of said band of paper thereon, driving means for rotating said second mentioned drum, a hopper for said varnish carried by said frame above said horizontal portion of the band, having its bottom at a small distance above said portion of the band, said bottom being provided with a slot-shaped aperture, parallel to said plane and at right angles to said path of travel, for discharging said varnish in the form of a thin sheet onto said band and the disks carried by it, and means for scraping said conveyer band after its passage under said hopper.

A. B. ST. HILAIRE.